Patented Apr. 27, 1943

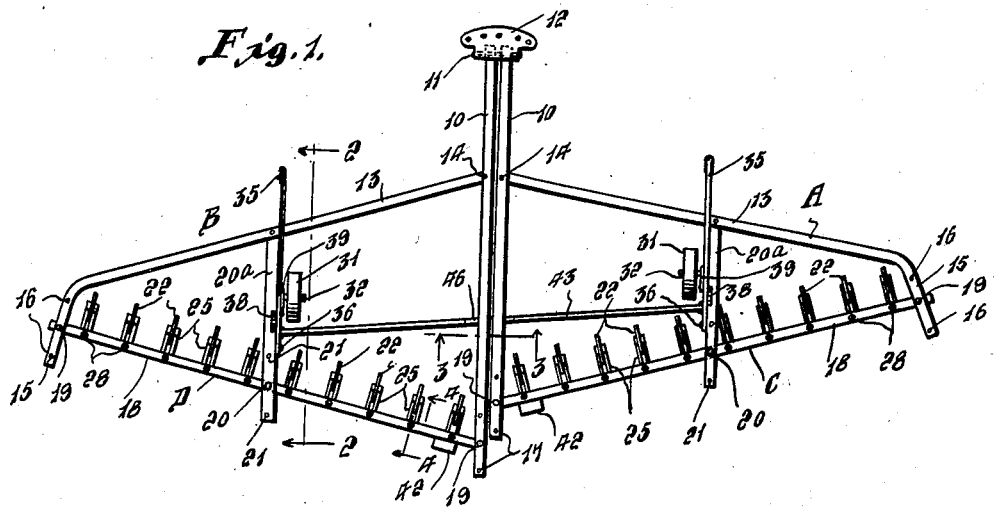

2,317,841

UNITED STATES PATENT OFFICE 2,317,841

ROTARY TILLER

Louis A. Wittrock, Sidney, Nebr.

Application June 19, 1941, Serial No. 398,841

2 Claims. (Cl. 97—235)

This invention relates to a rotary tiller.

It is aimed to provide a relatively simple and efficient construction capable of manufacture at a relatively low figure.

Among the objects are to provide a construction having a frame of novel form and coaction with the tiller members.

The more specific objects and advantages will become apparent from a consideration of the description following taken in connection with accompanying drawing illustrating an operative embodiment.

In said drawing:

Figure 1 is a plan view of the improved machine;

Figure 2 is a vertical section taken on an enlarged scale on the plane 2—2 of Figure 1, Figure 3 is a sectional detail taken on the line 3—3 of Figure 1, and Figure 4 is a vertical sectional view taken on the line 4—4 of Figure 1.

Referring specifically to the drawings wherein like reference characters designate like or similar parts, the machine consists of two sections A and B, each having a longitudinal beam at 10. Both beams 10 are connected by a horizontal pivot 11 to a clevis 12, adapted for hitching of the structure to a tractor or draft means. Each section A and B is adapted for vertical swinging movement in operation independently of the other on the horizontal axis afforded by the pivot 11. Cross beams 13 are rigidly connected at 14, one to each beam 10 and each crossbeam has a generally rearwardly extending extremity 15. Such extremities 15 have a series of openings 16 therethrough and the rear end portions of the beams 10 have a series of openings 17 therethrough. Tiller gangs C and D are connected by means of such openings, selectively, and thereby adjustably so that they may be disposed at different angles. The gangs are similar and each has a mounting bar 18 with holes at opposite ends through which detachable bolts 19 are passed and which may also be passed selectively through adjacent openings 16 and 17 according to the angle desired for the mounting bars 18.

In addition, said mounting bars 18, intermediate their ends, are pivoted by means of bolts 20 passing through openings therein, into selected openings 21 of series, thus further aiding in the adjustable mounting and angular disposition of the gang bars.

The coulter members are shown at 22 preferably being round and relatively flat and of any size desired. Such members 22 are sharpened at their peripheries from opposite sides and intermediate the same have cut-out portions or notches 23 of any desired number. As a result of such a construction, the members 22 are self-sharpening and may be reversed and in operation will leave trash upon the ground and will provide sub-soil depressions to retain moisture. These tiller members 22 are removably fastened for rotation and reversal by means of bolts 24, to brackets or standards 25 having shanks 26 rising therefrom and through openings 27 in the bars 18, above which bars they have one or more nuts 28 secured thereto. In addition, the members 26 below bars 18 have adjustment washers 29 surrounding the same, whose meeting faces are inclined or of cam shape as at 30, to facilitate the angular adjustment and height of operation of the tiller members.

Each section A and B is supported from the ground by a single wheel as at 31. Each wheel is journaled on a stub axle 32 of a bracket 33 pivoted at 34 adjacent to an auxiliary beam 20a fastened to and extending rearwardly from the crossbeams 13. An operating lever 35 is pivoted at 36 to each auxiliary beam 20a and has a conventional lock mechanism 37 coacting with a segment 38 fastened to the adjacent auxiliary beam 20a. Links 39 are pivotally connected at 40 to the brackets 33 and at 41 to the levers 35, so that through raising and lowering of the levers 35, the elevation of the wheels 31 may be varied or regulated to accordingly control the depth of operation of the associated tiller members 22.

I also provide weights at 42, one on each mounting bar 18 adjacent the inner end, to stabilize operation of the bars 18.

A cross rod 43 is pivotally connected on longitudinal axes by pivot members 44 and brackets 45 to the brackets 33. Such rod 43 extends beneath the beams 10 and in order to permit the relative vertical movement of the sections A and B without interference by the rod, the latter preferably has a central deflected portion 46. Rod 43 prevents any tendency of the sections A and B to separate laterally so that the gangs cannot pull away from each other, but can freely move vertically relatively to each other with the rod 43 appropriately swinging on its pivots 44.

Various changes may be resorted to provided they fall within the spirit and scope of the invention.

I claim as my invention:

1. A device of the class described having sections, each section having a longitudinal beam, a hitching member pivotally connected to both beams, permitting the latter to move independently of each other, crossbeams, auxiliary beams extending rearwardly from the crossbeams, mounting bars, said beams having series of openings therethrough, bolts passing through the bars and selected ones of said openings to adjustably mount the bars, tiller means carried by the bars, and adjustable ground engaging wheel means for each section mounted on the auxiliary beams.

2. A device of the class described having sections, each section having a longitudinal beam, a hitching member pivotally connected to both beams, permitting the latter to move independently of each other, crossbeams, auxiliary beams extending rearwardly from the crossbeams, mounting bars, said beams having series of openings therethrough, bolts passing through the bars and selected ones of said openings to adjustably mount the bars, tiller means carried by the bars, adjustable ground engaging wheel means for each section mounted on the auxiliary beams, a rod pivoted to both ground engaging wheel means passing under the first mentioned beams engageable with the latter to support the same.

LOUIS A. WITTROCK.